United States Patent Office 3,117,137
Patented Jan. 7, 1964

3,117,137
PROCESS FOR THE PRODUCTION OF ESTERS OF TERTIARY ALCOHOLS
Marcello de Maldé and Emilio Perrotti, San Donato Milanese, Nedo Marilli, Milan, and Ferdinando Fognani, San Donato Milanese, Italy, assignors to Laboratori Riuniti Studi e Ricerche S.p.A., San Donato Milanese, Italy, a company of Italy
No Drawing. Filed May 9, 1961, Ser. No. 108,772
Claims priority, application Italy May 16, 1960
4 Claims. (Cl. 260—347.5)

It is an object of the present invention to produce esters from iso-olefins and solid aromatic or heterocyclic organic acids by means of a reaction conducted in the presence of suitable catalysts and under such conditions as to be economically convenient and capable of simple conduction on an industrial scale.

It is known to prepare esters starting from olefins and from organic acids, operating under suitable conditions of pressure and temperature, employing as catalysts strong mineral acids, sulfonic acids, such as for instance arylsulfonic acid and trifluoromethylene-sulfonic acid, exchange resins, boron trifluoride and so on.

The reaction is conducted generally, once the best conditions of pressure and temperature have been established, by bubbling the olefin directly into the liquid organic acid or in the case of solid organic acid, into the solution thereof in a suitable solvent, in the presence of the catalyst.

It is also known that benzoate of tert. butyl may be prepared by reaction of iso-butylene with benzoic acid in dioxane, in the presence of 100% $H_2SO_4$ as a catalyst.

All of the processes known however present considerable inconveniences and have limitations since operation for instance under pressure enormously favours the polymerization reaction. The use of concentrated sulfuric acid too favours polymerization in the case of the iso-olefin thereby rendering the esterification at least difficult.

It has now been found surprisingly that the object of the present invention is completely attained if the esterification by direct addition of the organic acid to the olefin is effected in the presence of a particular catalyst.

This may be any one of the compounds corresponding to the general formula:

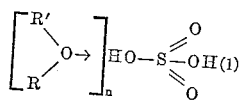

where:
$R'$=aryl, alkyl, hydrogen;
$R$=Alkyl, hydrogen;
$n$=1 or 2.

In Table 1 are reported by way of indications some types of the compound $R'-O-R$.

The catalysts of the present invention are in practice oxonium salts and are characterized by a ratio

of 1:1 or 2:1.

Their use keeps polymerization within very low limits while esterification takes place with great speed.

For values of the ratio $R'-O-R/H_2SO_4$ lower than 1:1 instead the polymerization reaction prevails; for values of the ratio higher than 2:1 the esterification speed diminishes considerably.

It is particularly practical and economical to employ as a catalyst the compound indicated at No. 6 of the table, in which there is $R'=R=H$ and which corresponds, therefore, to $H_2SO_4 \cdot H_2O$. It renders the esterification reaction speedy also at low concentrations without the olefin polymerization reaction taking place, whence there is the possibility of having the reaction take place directly between the organic acid and said olefin in the liquid state.

TABLE 1

| $R'$ | $R$ | $R'-O-R$ | No. |
|---|---|---|---|
| $C_6H_5$ | $CH_3$ | Anisol | 1 |
| $C_2H_5$ | $C_2H_5$ | Ethyl ether | 2 |
| $C_5H_{11}$ | $C_5H_{11}$ | Iso-amyl ether | 3 |
| $C_6H_5$ | H | Phenol | 4 |
| $C_2H_5$ | H | Ethyl alcohol | 5 |
| H | H | Water | 6 |

According to the present invention it is possible to employ solvents dissolving even only partly the reactant acids, selected preferably from the class of hydrocarbons, such as for instance benzene, toluene, benzin, or an excess of the very reactant olefin, kept in the liquid phase. Solvents are understood to be compounds which are not required to dissolve completely or to great extent the acid, it being sufficient, thanks to the possibility of conducting the reaction substantially in heterogeneous phase, to have only a partial solubilization. This has permitted the application of the process of the present invention to the preparation of compounds not obtained or obtained with great difficulty heretofore.

The value of the pressure is to be selected taking into account that for normally liquid hydrocarbon solvents it may be atmospheric, while in the case of the olefin as a solvent, it should assume the value necessary to keep the latter in the liquid phase.

It is obvious that also with liquid hydrocarbon solvents an increase in pressure acts favourably permitting to attain a higher concentration of reactants, without having, by virtue of the particular catalysts employed, those inconveniences to be found with processes known heretofore.

The operating temperature is any temperature selected between 0° C. and 50° C., preferably between 20° C. and 25° C.

A particular manner of procedure according to the present invention is characterized in that there is employed as a catalyst the hydrate $H_2SO_4 \cdot H_2O$, which is added in suitable quantity under stirring, at a temperature between 0° and 50° C., preferably between 20° and 25° C. and under pressure, to a heterogeneous mixture previously formed, stirring the organic acid and the olefin in liquid phase, in suitable molar ratio.

The reaction is considered to be carried to completion when the organic acid is completely dissolved; the time necessary for this operation depends on the concentration of the catalyst. Under these conditions the liquid phase is discharged and bubbled in alkali; the excess of olefin is nearly totally recovered and from the alkaline solution also the unreacted organic acid is recovered. The yields obtainable vary between 75 and 95%.

Since in practice the manner of procedure is a function of numerous factors, the described procedure is only relative to a particular case, but from what has been said above it will be easily observed how adaptations thereof are possible, without meeting any difficulties from the technical point of view, and without departing from the scope of the present invention.

The following examples, reported for the purpose of better illustrating the invention, should not be construed in any manner as a limitation thereof.

*Example 1*

Into a pressure flask were charged 24.4 g. of benzoic acid (0.2 mol), 66 g. of iso-butylene (1.2 mol) and 9.6 g. of $(C_2H_5)_2O \cdot H_2SO_4$ (0.05 mol). The flask was mounted on a shaking agitator and kept in agitation for one hour at room temperature; after that time the benzoic acid is completely dissolved and the solution is discharged, and is made to bubble under its own pressure into 100 ml. of a 10% cold NaOH solution kept under agitation; the excess iso-butylene is recovered by means of a cooled trap with frigorific mixture. The organic layer is separated which is subjected to distillation under vacuum. Colourless liquid having B.P. (0.2 mm. Hg)=60 to 63° C.; yield 33.7 g. Isobutylene recovered=51.3 g. From the alkaline wash water are recovered by acidification with concentrated hydrochloric acid 0.5 g. of benzoic acid.

*Example 2*

Into a pressure flask were charged 24.4 g. of benzoic acid (0.2 mol), 66 g. of isobutylene (1.2 mol) and 10.3 g. of $C_6H_5OCH_3 \cdot H_2SO_4$ (0.05 mol). The flask was mounted on a shaking agitator and kept in agitation for two hours at room temperature. After that time the acid is completely dissolved and the limpid solution is discharged by making it bubble under its own pressure; into 100 ml. of a 10% NaOH solution under agitation; the excess isobutylene is recovered in a cooled trap with a frigorific mixture. The organic liquid separated from the alkaline solution is subjected to distillation under vacuum. Colourless liquid having B.P. (0.2 mm. Hg)= 60 to 63° C.; $n_D^{20}$=1.4910; yield 33.5 g. The recovered iso-butylene weighs 49.7 g. From the alkaline wash water; 0.4 g. of benzoic acid are recovered by acidification with concentrated hydrochloric acid.

*Example 3*

Into a pressure flask were charged 24.4 g. of benzoic acid (0.2 mol); 66.6 g. of iso-butylene (1.2 mol) and 4.8 g. of $C_6H_5OH \cdot H_2SO_4$ (0.025 mol). The flask was mounted on a shaking agitator and kept in agitation for one hour at room temperature. After that time the benzoic acid is completely dissolved, so the solution is discharged by making it bubble under its own pressure into 100 ml. of a 10% NaOH solution, under agitation; the olefin excess is recovered in a trap cooled with frigorific mixture. The organic liquid separated is subjected to distillation under reduced pressure. Colourless liquid having B.P. (0.2 mm. Hg)=60 to 63° C.; $n_D^{20}$=1.4910; yield 33.7 g. The recovered iso-butylene weighs 48.5 g. From the alkaline wash water are recovered 0.3 g. of benzoic acid by acidification with concentrated hydrochloric acid.

*Example 4*

Into a pressure flask were charged 24.4 g. of benzoic acid (0.2 mol), 65.8 g. of iso-butylene (about 1.2 mol) and 3.7 g. (0.025 mol) of $C_2H_5OH \cdot H_2SO_4$. The flask was mounted on a shaking agitator and kept in agitation for one hour and a half at room temperature.

After that time the benzoic acid is completely dissolved and the solution is discharged by making it bubble, under its own pressure, into 100 ml. of a 10% NaOH solution under agitation; the excess olefin is recovered in traps cooled with frigorific mixture and the organic liquid separated is subjected to distillation under reduced pressure. Colourless liquid, B.P. (0.2 mm. Hg)=60–63° C.; $n_D^{20}$=1.4908; yield 33.2 g. The recovered iso-butylene weighs 51.0 g. From the alkaline water (liquor) are recovered 0.6 g. of benzoic acid by acidification with concentrated hydrochloric acid.

*Example 5*

Into a pressure flask were charged 24.4 g. of benzoic acid (0.2 mol), 66 g. of iso-butylene (1.2 mol) and 2.5 g. of $H_2SO_4$ (0.025 mol). The mixture becomes heated strongly and the liquid assumes brown colour; after cooling down the flask is mounted on a shaking agitator and kept under agitation at room temperature for four hours. After that time the mixture comprises unaltered benzoic acid and a brown liquid, boiling entirely at a temperature higher than room temperature, which is shaken with 100 ml. of a 10% NaOH solution and thereafter subjected to distillation under reduced pressure. The following fractions are obtained:

1st fraction—B.P. (0.2 mm. Hg)=20–25° C. constituted by di-iso-butylene, $n_D^{21}$=1.4122; weight=50.7 g.;

2nd fraction—B.P. (0.2 mm. Hg)=30–50° C. constituted by di-iso-butylene and tri-iso-butylene; $n_D^{21}$=1.4280; weight 5.3 g.;

3rd fraction—B.P. (0.2 mm. Hg)=50–70° C., constituted by tri-iso-butylene and benzoate of tert.-butyl, in ratio of about 2:1; $n_D^{21}$=1.4583; weight=14.7 g.

*Example 6*

Into a pressure flask were charged 24.4 g. of benzoic acid (0.2 mol); 66 g. of iso-butylene (1.2 mol) and 2.7 g. of $H_2SO_4 \cdot H_2O$ (84.4% sulfuric acid) (0.025 mol). The flask was mounted on a shaking agitator and kept under agitation for two hours at room temperature. After 50–55 minutes stirring the benzoic acid is completely dissolved. The limpid and colourless solution is discharged by making it bubble under its own pressure into 100 ml. of 10% NaOH solution under agitation, the excess olefin is recovered in traps cooled down with frigorific mixture and the organic liquid separated is subjected to distillation under reduced pressure. Colourless liquid having B.P. (0.2 mm. Hg)=60–63° C.; $n_D^{20}$=1.4910; yield 33.1 g. The iso-butylene recovered weighs 51.5 g. From the mother liquors of the alkaline washing, 0.7 g. of benzoic acid are recovered by acidification with concentrated hydrochloric acid.

*Example 7*

Into a pressure flask were charged 24.4 g. of benzoic acid (0.2 mol), 66.2 g. of iso-butylene (1.2 mol) and 2.1 g. of $H_2SO_4 \cdot \tfrac{1}{2}H_2O$ (0.025 mol). The flask was mounted on a shaking agitator and kept under agitation for two hours and a half at room temperature. After this time the benzoic acid is almost completely dissolved and the solution is discharged by making it bubble, under its own pressure, into 100 ml. of a 10% NaOH solution under agitation. The excess olefin is recovered in traps cooled with frigorific mixture and the organic liquid separated is subjected to distillation under reduced pressure. The following fractions are obtained:

1st fraction—B.P. (0.2 mm. Hg)=20–25° C.; $n_D^{20}$=1.4131, constituted by di-iso-butylene, weight=14 g.;

2nd fraction—B.P. (0.2 mm. Hg)=60–67° C.; $n_D^{20}$=1.4891, constituted by tert.-butyl benzoate, weight=27.9 g.

The iso-butylene recovered weighs 39.2 g. From the alkaline mother-liquor are recovered 3.7 g. of benzoic acid by acidification with concenrated hydrochloric acid.

*Example 8*

Into a pressure flask were charged 24.4 g. of benzoic acid (0.2 mol), 66 g. of iso-butylene (1.2 mol) and 13.4 g. of $H_2SO_4 \cdot 2H_2O$ (0.1 mol). The flask was mounted on a shaking agitator and kept under agitation for three hours and a quarter at room temperature. After that time the benzoic acid is completely dissolved. The limpid and colourless solution is discharged by making it bubble under its own pressure, into 100 ml. of a 10% NaOH solution under agitation; the excess olefin is recovered in traps cooled with suitable frigorific mixture and the organic liquid separated from the alkaline solution is subjected to distillation under reduced pressure. Colourless liquid having B.P. (0.2 mm. Hg)=60–63° C.; $n_D^{20}$=1.4908; yield 29.4 g. The iso-butylene recovered weighs 38.4 g. From the mother liquor of the alkaline wash, 3.7 g. of benzoic acid are recovered by acidification with concentrated hydrochloric acid.

*Example 9*

Into a three-necked flask were introduced 400 ml. of benzene and 325 g. of benzoic acid. After having saturated with iso-butylene, ½ equivalent of acid ethyl etherate are added as a catalyst. Continuing bubbling iso-butylene in the reaction medium, the mass is kept in agitation for about one hour, then is neutralized with aqueous soda. Two phases were obtained, organic and aqueous, the distillation of which permits isolating the following products: benzene (almost quantitative recovery; trimethyl carbinol 6.9 g.; di-iso-butylene 2.3 g.; trimethyl carbinol benzoate 294.2 g.

*Example 10*

Into a three-necked flask are introduced 400 ml. of toluene, 300 g. of benzoic acid and ½ equivalent of monohydrate sulfuric acid. The reaction medium is kept saturated with iso-butylene. After one hour neutralization is effected with aqueous soda. The distillation is effected of the two phases which result from neutralization, obtaining the following products: toluene (almost quantitative recovery); trimethyl carbinol 14.1 g.; di-iso-butylene 21.7 g.; tri-iso-butylene 4.1 g.; trimethyl carbinol benzoate 289 g.

*Example 11*

Into a three-necked flask there are introduced 400 ml. of toluene; 300 g. of benzoic acid and ½ equivalent of ethyl acid etherate. The reaction medium is maintained saturated with iso-butylene. After one hour the mass is neutralized with aqueous soda. The two phases are distilled and the following products are obtained; toluene (almost quantitative recovery); trimethyl carbinol 8.8 g.; di-iso-butylene 12.6 g.; trimethyl carbinol benzoate 238.0 g.

*Example 12*

Into a three-necked flask were introduced 400 ml. of benzene, 300 g. of benzoic acid and ½ equivalent of monohydrate sulfuric acid. The solution is kept saturated with iso-butylene for one hour, then it is neutralized with aqueous soda. The distillation of the two phases, which result from neutralization, has permitted the recovery of the following products: trimethyl carbinol 20.0; di-iso-butylene 8.8 g.; tri-iso-butylene 13.7 g.; trimethyl carbinol benzoate 285 g.

*Example 13*

Into a pressure flask were charged 5 g. of pyromucic acid; 24 ml. of iso-butylene and 0.825 ml. of monohydrate sulfuric acid. The flask was mounted on a shaking agitator and was kept in agitation for about two hours at room temperature. After having cooled down, the flask is opened continuously and is neutralized with a 6% aqueous NaOH. Two phases are obtained, one aqueous and the other one organic, the latter is separated and on a portion there is determined the saponification number. The analytical result is as follows: 7.26 g. of trimethyl carbinol pyromuciate, equal to 96% of transformed substance. The remainder of the phase is distilled under vacuum (2 mm. Hg). The product is separated and is characterized at the infrared. The B.P. (2 mm. Hg) is 40–45° C.; $n_D^{20}=1.4674$; $D_{23}=1.036$.

*Example 14*

Into a pressure flask were charged 4 g. of m-toluic acid, 24 ml. of iso-butylene and 0.825 of monohydrate sulfuric acid. After having operated as in the preceding example, the saponification number is determined on the organic phase. The analytical result is as follows: 5.4 g. of trimethyl carbinol metatoluate equal to 93.2% of transformed substance. The remainder of the organic phase is distilled under vacuum (2 mm. Hg). The product is separated and is characterized at the infrared. The B.P. (2 mm. Hg) is 65° C.; $n_D^{20}=1.4907$; $D_{23}=0.976$.

We claim:

1. A process for the production of esters of tertiary alcohols which comprises adding an organic acid, selected from the group consisting of benzoic, toluic and pyromucic acids, to a tertiary olefin, expecting the reaction at a temperature between 0° and 50° C. under pressure and in the presence of an excess of the tertiary olefin as a solvent and of an oxonium salt as a catalyst, the catalyst having the formula

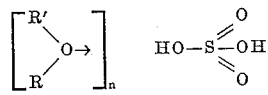

where R' is selected from methyl, phenyl and ethyl groups and hydrogen; R is selected from methyl and ethyl groups and hydrogen and $n$ is an integer no smaller than 1 and no greater than 2.

2. A process for the production of an ester of a tertiary alcohol comprising adding an organic acid, selected from the group consisting of benzoic, toluic and pyromucic acids, to a tertiary olefin, effecting the reaction at a temperature between 0° C. and 50° C. under pressure, in the presence of a hydrocarbon solvent selected from the group consisting of benzene, toluene, and the tertiary olefin itself where the latter is in excess, and in the presence of an oxonium salt as a catalyst, the catalyst having the formula:

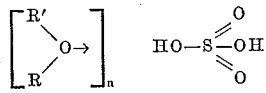

where R' is selected from methyl, phenyl and ethyl groups and hydrogen; R is selected from methyl and ethyl groups and hydrogen; and $n$ is an integer not less than 1 nor larger than 2.

3. A process according to claim 2 wherein the solvent is an aromatic hydrocarbon solvent and is selected from the group consisting of benzene and toluene, and the catalyst is selected from the group consisting of the monohydrate and dihydrate of sulfuric acid.

4. A process according to claim 2 in which the reaction takes place at a temperature between 20° and 25° C.

References Cited in the file of this patent

UNITED STATES PATENTS 2,741,632    Cottle    Apr. 10, 1956

FOREIGN PATENTS 961,533    Germany    Apr. 11, 1957

OTHER REFERENCES

Evans et al.: Ind. and Eng. Chem., vol. 30 (1938), pages 55–58.

Altschul: J. Amer. Chem. Soc., vol. 68 (1946), pages 2605–2609.

Groggins: Unit Processes in Organic Processes (3rd ed., 1947), pages 262–4 and 645.

Jones: Inorganic Chemistry (1947), pages 406–7.

Noller: Chem. of Organic Compounds (second edition, 1951), pages 98–9 and 138.

UNITED STATES PATENT OFFICE
CERTIFICATE OF CORRECTION

Patent No. 3,117,137　　　　　　　　　　　　　　　January 7, 1964

Marcello de Malde et al.

It is hereby certified that error appears in the above numbered patent requiring correction and that the said Letters Patent should read as corrected below.

Column 6, line 9, for "expecting" read -- effecting --.

Signed and sealed this 19th day of January 1965.

(SEAL)
Attest:

ERNEST W. SWIDER
Attesting Officer

EDWARD J. BRENNER
Commissioner of Patents